US008645694B2

(12) United States Patent
Schrijen et al.

(10) Patent No.: US 8,645,694 B2
(45) Date of Patent: Feb. 4, 2014

(54) METHOD OF AUTHENTICATION BASED ON POLYOMIALS

(75) Inventors: Geert Jan Schrijen, Eindhoven (NL); Thomas Andreas Maria Kevenaar, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1355 days.

(21) Appl. No.: 11/575,786

(22) PCT Filed: Sep. 27, 2005

(86) PCT No.: PCT/IB2005/053188
§ 371 (c)(1),
(2), (4) Date: Mar. 22, 2007

(87) PCT Pub. No.: WO2006/035400
PCT Pub. Date: Apr. 6, 2006

(65) Prior Publication Data
US 2008/0209214 A1    Aug. 28, 2008

(30) Foreign Application Priority Data
Sep. 30, 2004    (EP) .................................... 04104780

(51) Int. Cl.
*H04L 29/06*    (2006.01)
(52) U.S. Cl.
USPC ............... 713/169; 713/168; 726/2; 726/29; 380/260; 380/262; 380/279
(58) Field of Classification Search
USPC ....................................................... 713/168
See application file for complete search history.

(56) References Cited

U.S. PATENT DOCUMENTS

| 5,202,921 | A  | * | 4/1993 | Herzberg et al. | ............ | 713/162 |
| 6,480,957 | B1 | * | 11/2002 | Liao et al. | ...................... | 713/170 |
| 2002/0023032 | A1 | * | 2/2002 | Pearson et al. | .................. | 705/35 |

(Continued)

FOREIGN PATENT DOCUMENTS

| EP | 511483 B1 | 11/1992 |
| WO | 03077470 A1 | 9/2003 |

OTHER PUBLICATIONS

Ben-Or et al., "Multi-Prover Interactive Proofs: How to Remove Intractability Assumptions", 1988, pp. 113-131.*
Blom et al "Non-Public Key Distribution", Advances in Cryptology, Roceedings of Crypto, A Workshop on the Theory and Application of Cryptographic Techniques, pp. 231-236, 1982, XP000670433.

(Continued)

*Primary Examiner* — Taghi Arani
*Assistant Examiner* — Thaddeus Plecha
(74) *Attorney, Agent, or Firm* — Larry Liberchuk

(57) ABSTRACT

There is provided an authentication method for a system (10) comprising several devices (30). The method involves: a) providing each device (30) with an identity value (pi: i=1, . . . , n) and a polynomial (P) for generating a polynomial key; (b) including a verifier device ($p_1$) and a prover device ($P_2$)amongst said devices (30); (c) arranging for the prover device ($p_2$) to notify its existence to the verifier device ($P_1$); (d) arranging for the verifier device ($p_t$) to challenge the prover device ($p_2$) to encrypt a nonce using the prover ($P_2$) device's polynomial (P) key and communicate the encrypted nonce as a response to the verifier device ($p_1$); (e) arranging for the verifier device ($p_1$) to receive the encrypted nonce as a further challenge from the prover device ($p_Z$) and: (i) encrypt the challenge using the polynomial keys generated from a set of stored device identities; or (ii) decrypt the challenge received using the set of polynomial keys; until said verifier device ($p_1$) identifies an authentication match.

11 Claims, 3 Drawing Sheets

(56) References Cited

U.S. PATENT DOCUMENTS

| | | | |
|---|---|---|---|
| 2003/0226017 A1* | 12/2003 | Palekar et al. | 713/168 |
| 2004/0066278 A1* | 4/2004 | Hughes et al. | 340/10.1 |
| 2005/0265550 A1* | 12/2005 | Tuyls et al. | 380/259 |
| 2008/0069344 A1* | 3/2008 | Yao et al. | 380/44 |

OTHER PUBLICATIONS

Bruce Schneier: "Applied Cryptography", John Wiley & Sons Inc, Second Edition, pp. 59-62, 1996.

Martin Abadi: "Private Authentication", Springer Lecture Notes in Computer Science, vol. 2482, pp. 27-40, 2003.

* cited by examiner

METHOD OF AUTHENTICATION BASED ON POLYOMIALS

FIELD OF THE INVENTION

The present invention relates to methods of authentication based on polynomials. Moreover, the invention also relates to systems and apparatus operable according to these methods.

BACKGROUND TO THE INVENTION

Authentication protocols are used in contemporary communication systems for enabling a first party to prove its identity towards a second party; for convenience, these first and second parties are conveniently denoted by prover and verifier respectively. In many known protocols, the prover first claims an identity, after which the prover proves knowledge of some secret associated with the prover's claimed identity. A protocol in which two parties are being assured of each other's identity is referred to as "mutual authentication". Such authentication is often implemented using key establishment procedures, for example using public-private key authentication protocols. These authentication protocols not only verify identity, but also often establish symmetrical session keys with which further communications can be encrypted and authenticated.

The inventors have appreciated that it is desirable that identities of mutually communicating parties cannot be determined by third parties observing or eavesdropping on the mutually communicating parties. Such a situation can potentially arise in practice when a user authenticates herself using a wireless smart card presented to a smart card reader, for example a smart card reader at an entrance of a high-security building. If a standard authentication protocol is employed at the entrance, an eavesdropper could hypothetically simply detect the presence of a user at this location. Such detection can potentially provide essential initial information for executing location tracking of the user. Moreover, this location tracking can constitute an invasion of personal privacy.

This problem has already been envisaged by Martin Abadi in a scientific paper with title "Private Authentication" presented at a Conference on Privacy Enhancing Technologies (PET2002), San Fracisco, USA, Apr. 2002 whose proceedings are published in Springer Lecture Notes in Computer Science vol. 2482/2003, pp. 27-40. In the paper, M. Abadi describes two protocols which are variants of known Denning-Sacco and Needham-Schroeder protocols as elucidated in B. Schneier publication "Applied Cryptography", Second Edition published by John Wiley & Sons Inc. in 1996. A problem of these recently proposed protocols by M. Abadi is that public key cryptography is employed requiring a relatively large amount of processing power for its implementation, such processing power often not being practical and/or available on small consumer devices, for example portable battery-powered devices.

A more recent polynomial-based multi-user key generation and authentication method is described in a published international PCT patent application WO 03/077470 (attorney docket PHNL020192). In this PCT application, there is described a method of generating a common secret between a first party and a second party. These parties can be, for example, devices in a home network operable in accordance with a contemporary Digital Rights Management (DRM) framework. The devices calculate the common secret by evaluating a product of two polynomials $P(x, y)$ and $Q(x, z)$ using parameters previously distributed by a Trusted Third Party (TTP) and parameters obtained from another device. Optionally, each party subsequently verifies that the other party has generated the same secret using a zero-knowledge protocol or a commitment-based protocol. Such a method described in this published PCT application is especially suitable for use in conjunction with low power devices such as Chip-In-Disc type devices. The inventors have appreciated that even this recent authentication method has drawbacks and limitations which the inventors seek to address by way of the present invention.

SUMMARY OF THE INVENTION

An object of the present invention is to provide an alternative authentication protocol method.

According to a first aspect of the present invention, there is provided a method of authentication based on polynomials for a system comprising a plurality of devices operable to mutually communicate; said method comprising steps of:
(a) providing each of said plurality of devices with a corresponding identity value
   ($p_i$: i=1, n) together with an associated polynomial (P) for generating a polynomial key;
(b) arranging for the plurality of devices to include a verifier device ($p_1$) and a prover device ($p_2$);
(c) arranging for the prover device ($p_2$) to notify its existence to the verifier device ($p_1$);
(d) arranging for the verifier device ($p_1$) to issue a first challenge to the prover device ($p_2$) to encrypt a nonce using the prover ($p_2$) device's polynomial (P) key and communicate the encrypted nonce as a response to the verifier device ($p_1$);
(e) arranging for the verifier device ($p_1$) to receive the encrypted nonce as the response from the prover device ($p_2$) and:
   (i) to encrypt the first challenge using the polynomial keys generated from a set of stored device identities; or
   (ii) to decrypt the encrypted response received from the prover device ($p_2$) using the polynomial keys;
until said verifier device ($p_1$) identifies a match for said response, said match being indicative of authentication.

The invention is of advantage in that it is capable of providing a more flexible procedure for authentication based on polynomials.

A "polynomial key" is a numerical result of evaluating a polynomial, for example $k=P_{p1}(p_2)$, wherein k is a key, $P_{p1}$ is a polynomial, and $p_2$ is a value input to the polynomial.

Individual devices in the system are capable of operating both as verifiers and. provers. Optionally, one or more of the devices of the system are capable of concurrently functioning as both verifiers and provers.

Optionally, in step (a) of the method, issuance of the identity values ($p_i$) and associated polynomials is undertaken via a trusted third party. Such an approach results in a trusted deployment of the system Optionally, the method includes a further step of applying said method of authentication in general mutual authentication key establishment protocols in said system for providing mutual authentication for said plurality of devices.

Optionally, in the method, a random value is additionally created by the prover device and encrypted together with the response from the verifier device for sending back to the verifier device, said random number being operable to function as a session key. This session key is beneficially updated so as to provide not only a record of a sequence of communication but also protect against eavesdropping on the plurality of devices.

Optionally, in the method, the first challenge from the verifier device ($p_1$) to the prover device ($p_2$) is a random value. The use of nonces implemented as random values renders the system more difficult to eavesdrop.

Optionally, the method further includes a step of configuring the system so that said plurality of devices includes multiple prover devices and multiple verifier devices, said multiple prover devices including a subset of prover devices operable to authenticate to a particular verifier device of the multiple verifier devices.

Optionally, in the method, said prover devices are implemented as smart cards or tags enabling access to services related to and/or coupled to a given verifier device.

Optionally, in the method, the polynomial is operable to function as a Blom-type key. Blom-types keys are elucidated in the foregoing with regard to a publication by Rolf Blom (Linkoping University) which is incorporated by reference.

Optionally, in the method, the prover device is operable to apply a hash function or keyed hash function to create a response to the first challenge from the verifier device.

According to a second aspect of the invention, there is provided a system operable according to the method of the first aspect of the invention.

Optionally, the system is adapted for providing at least one of:
(a) authentication associated with financial transactions executed within banking systems;
(b) controlling access, for example personnel access, by way of tags or similar portable identifiers authenticating within a system operable according to the method.

According to a third aspect of the invention, there is provided software on a data carrier executable on computing hardware to implement the method according to the first aspect of the invention.

According to a fourth aspect of the invention, there is provided a smart card or tag for undertaking authentication in an authentication system, the system being arranged to be operable according to a method according to the first aspect of the invention.

It will be appreciated that features of the invention are susceptible to being combined in any combination without departing from the scope of the invention.

DESCRIPTION OF THE DIAGRAMS

Embodiments of the invention will now be described, by way of example only, with reference to the following diagrams wherein.

DESCRIPTION OF EMBODIMENTS OF THE INVENTION

In the present invention, the inventors have devised an authentication protocol operable to provide privacy and protection against eavesdropping without complications associated with utilizing public key cryptography. Moreover, the devised protocol is capable in use of providing more flexibility than purely symmetrical key-based approaches. The inventors' authentication protocol is based on a scheme proposed by Rolf Blom in a scientific paper "Non-public key distribution" published in Advances in Cryptography, Proceedings of Crypto '82, pp. 231-236, 1983; disclosure in R. Blom's scientific paper is herewith incorporated by reference for purposes of elucidating the present invention.

An embodiment of the present invention implemented as a system will be described with reference to FIG. 1. The system comprises a third party denoted by TTP which chooses a symmetrical matrix T having a size (n+1) rows by (n+1) columns; the matrix T has element entries denoted by $t_{ij}$ wherein an index i denotes matrix column and an index j denotes matrix row. For the matrix T to exhibit symmetry, the element entries are implemented such that $t_{ij}=t_{ji}$. The entries $t_{ij}$ of this matrix T thereby form coefficients of an n-th degree polynomial denoted by P(x, y) which is defined by Equation 1 (Eq. 1):

$$P(x, y) = \sum_{i,j=0}^{n} t_{ij} \cdot x^i \cdot y^j \qquad \text{Eq. 1}$$

On account of the matrix T being symmetrical, it follows therefrom that the polynomials P(x, y) =P(y, x) for all x and y in a field of values $GF(2^k)$. The trusted third party TTP issues to each device i included within the system an identity value pi and a corresponding private projected polynomial denoted by $P_{pi}(y)$. This private projected polynomial $P_{pi}(y)$ is generated by the third party TTP by assigning a first argument of polynomial P(x, y) to be equal to a devices' identity value $p_i$ as described by Equation 2 (Eq. 2):

$$P_{pi}(y)=P(p_i,y)=P(x,y)|_{x=pi} \qquad \text{Eq. 2}$$

From Equation 1, it follows that the symmetry of the matrix T and the resulting symmetry of the polynomial P(x, y), Equation 3 (Eq. 3) pertains for all values of the identity values $p_i$, $p_j$ such that $p_i$, $p_j \in GF(2k)$:

$$P_{pi}(p_j)=P(p_i, p_j)=P(p_j, p_i)=P_{pj}(p_i) \qquad \text{Eq. 3}$$

Thus, the aforesaid system operates by each device obtaining from the third party TTP a projected polynomial P corresponding to its identity value $p_i$, this polynomial P being communicated as (n+1) coefficients $g_j^{(pi)}$ which are securely stored in the device. These coefficients are generated by the third party TTP according to Equation 4 (Eq. 4):

$$g_j^{(pi)} = \sum_{l=0}^{n} t_{lj} \cdot p_i^l \qquad \text{Eq. 4}$$

The projected polynomial $P_{pi}(y)$ of a given device having an identity value $p_i$ can thus be expressed by Equation 5 (Eq. 5):

$$P_{pi}(y) = \sum_{l=0}^{n} g_l^{(pi)} \cdot y^l \qquad \text{Eq. 5}$$

Figure 1:
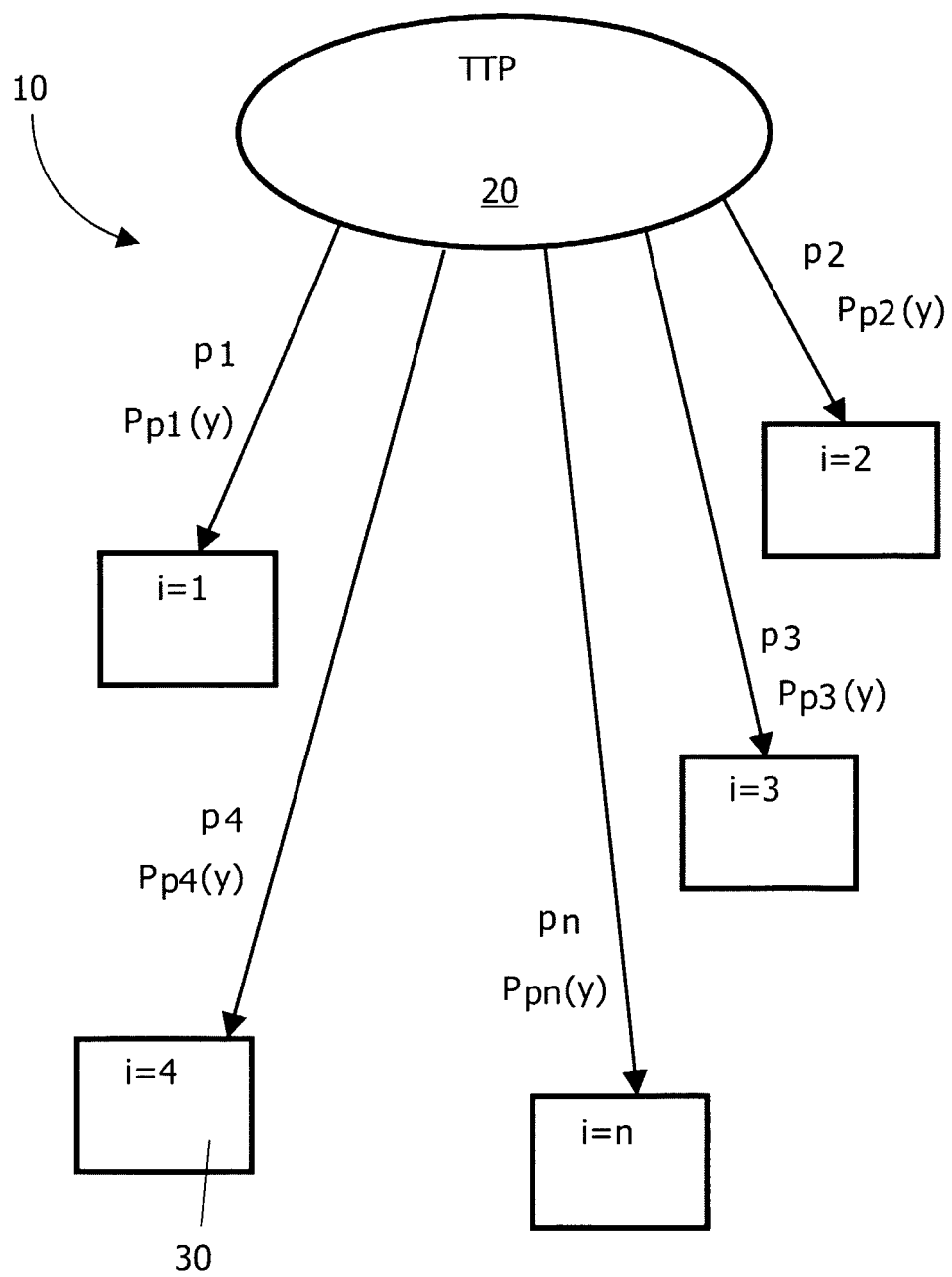
FIG. 1 is an illustration of a system being established for implementing a method of authentication according to the present invention.

Distribution of polynomial coefficients from the trusted third party TTP to individual devices is depicted in FIG. 1 wherein the aforesaid system is indicated generally by 10, the trusted third party TTP is denoted by 20, and one of the devices having an allocated identity i=4 is denoted by 30. In FIG. 1, there are five devices shown although the system 10 is assumed to include d devices where d is an integer of unity value or greater. The integer d does not need to be numerically equal to aforesaid parameter n. For reducing storage and processing power required in the system 10, it is desirable to arrange for n<d and assume that widespread collusion of devices within the system 10 does not occur in operation.

Having described in the foregoing a manner in which the polynomials P are generated by the third party TTP 20 and allocated to the devices, for example the device 30, operation of the system 10 for providing verification of authenticity will next be elucidated.

The devices in the system 10 are optionally operable to function as provers and verifiers; for example, a device with identity $p_2$ is capable of authenticating itself as a prover to a device with identity $p_1$ operable as a verifier. In a practical application of the present invention, the device operable as a verifier can be implemented as a tag reader at an entrance door of a high-security building. Moreover, in practice, there will then be multiple provers, for example implemented as user-wearable miniature RFID tags desirous of gaining entry into the high-security building. The verifier, for example the aforesaid tag reader, has a Configuration Table (CT) of length m stored therein. This Configuration Table comprises identity values $p_i$ of provers that can be authenticated and thereby allowed access. Optionally, the Configuration Table (CT) can be publicly accessible, namely it does not need to be maintained secret or confidential.

In the system 10, the Configuration Table is only susceptible to being updated by a system administrator. Optionally, the administrator is an owner of the verifier. In amending the Configuration Table, the administrator is operable to add identity values of provers to this Table (CT) in order to grant them access. In contradistinction to known symmetrical key arrangement, the present invention is distinguished in that no new shared key needs be established between a prover and a corresponding verifier when the prover is added to the Table (CT). Such a benefit arises because the system 10 involves providing the prover and verifier beforehand with corresponding private polynomials $P_{p2}(y)$ and $P_{p1}(y)$ respectively.

Figure 2:
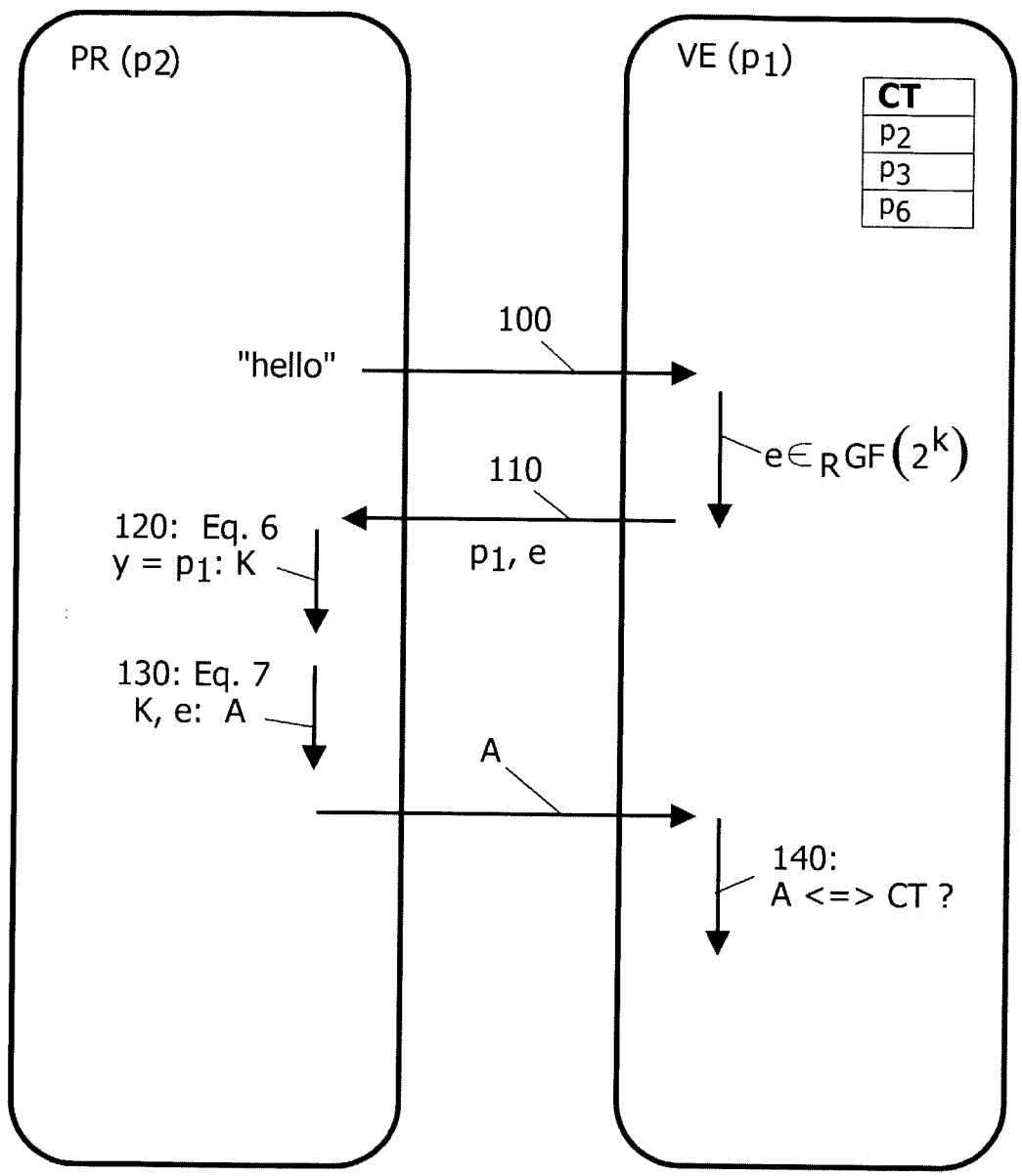
FIG. 2 is a depiction of communication exchange in a private authentication protocol in which a proving device $p_2$ authenticates to a verifying device $p_1$.

Operation of the system 10 will now be described in a scenario when the prover (PR) notifies its presence to the verifier (VE) by sending out a "hello" message 100 received by the verifier, namely a first invocation message as depicted in FIG. 2. The verifier VE then generates a random challenge e denoted by 110, after which the verifier VE sends the challenge e to the prover PR together with its identity value $p_1$. Next, the prover PR evaluates a corresponding polynomial $P_{p2}(y)$ therein by equating $y=p_1$ resulting in generation of a secret key K denoted by 120 according to Equation 6 (Eq. 6):

$$K=P_{p2}(p_1) \qquad \text{Eq. 6}$$

Next, the prover PR then uses this key K 120 to encrypt the challenge e 110 received thereat. The prover PR thereby generates a response A denoted by 130, the response 130 A being described by Equation 7 (Eq. 7):

$$A=E\{Km\}(e) \qquad \text{Eq. 7}$$

where a symbol E denotes an encryption operation, the response being then sent back to the verifier VE. Finally, as denoted by 140, the verifier VE checks for all the identity values in its Configuration Table (CT) to determine whether or not the received response A is a valid response. The verifier VE thereby for each identity pi in the Table (CT) is capable of constructing a secret key $K_i=P_{p1}(p_i)$ and encrypting the challenge e using the key $K_i$. If the verifier VE find a match for one of the pi values in its Configuration Table (CT), namely $E\{K_i\}(e)==A$, the identity corresponding to the value $p_1$ is authenticated. In this example, the verifier VE will find a match for the identity having a value $p_2$; such matching follows from $K==K_2$ on account of $P_{p2}(p_1)==P_{p1}(p_2)$.

Thus, in FIG. 2, there is presented a private authentication protocol in which a device having an identity $p_2$, namely the prover PR, authenticated to a device having an identity pi, namely the verifier VE. The verifier VE includes the Configuration Table (CT) containing the identities of sets of devices susceptible to being authenticated.

The protocol depicted in FIG. 2 is such that an eavesdropper can detect the identity of the verifier VE having an identity value $p_1$ but no identity information regarding the prover PR is susceptible to leaking to the eavesdropper. A party hostile to the system 10, for example an adversary or hacker, would potentially be able to retrieve a session key $K=P_{p2}(p_1)==P_{p1}(p_2)$, for example if the encryption cipher of Equation 7 is weak, but would be unable therefrom to identify the identity $p_1$, thus the system 10 would in such challenged circumstances maintain privacy. Moreover, on account of employing the random challenge e as in Equation 7, the response A will be different each time an attempt for authentication purposes in connection with the identifier $p_2$; in consequence, an eavesdropping party is not able to derive an identification by frequency analysis.

The prover PR in the aforementioned protocol as depicted in FIGS. 1 and 2 will be aware that its identity will be visible to the verifier VE. In practice, the prover optionally does not implement the aforementioned protocol with all possible verifiers, since they can then all learn the prover's identity. Potentially, in the system 10, one of the verifiers, for example if hostile, could track one of the devices within the system 10. In order to try to address such a problem, the given prover PR is provided with its own Configuration Table (CT) including the identities of verifier devices VE in the system 10 with which the given prover PR is prepared to communicate. In this mode of operation wherein the prover PR also has a Configuration Table (CT), the prover PR will not correspond to a challenge from a verifier that is not on the prover's (PR) CT table.

It will be appreciated that embodiments of the invention described in the foregoing are susceptible to being modified without departing from the scope of the invention as defined by the accompanying claims.

Devices in the system 10 are capable of being configured so that they are operable to provide verification and proving functions concurrently.

In a first further embodiment of the invention, a symmetrical cipher is employed when mutual authentication is implemented using the aforementioned protocol. Alternatively, the prover PR is operable to generate its response A by using a one-way hash function denoted by h( ). The response A generated by the prover PR will then be according to Equation 8 (Eq. 8):

$$A=h(P_{p2}(p_1), e) \qquad \text{Eq. 8}$$

Similarly, the verifier VE is operable to check the response A according to Equation 9 (Eq. 9):

$$h(P_{p1}(CT(j)), e)=A \text{ for } j=1\ldots m \qquad \text{Eq. 9}$$

In a second further embodiment of the invention, instead if encrypting the challenge e with all possible keys $K_i=P_{p1}(p_i)$ from devices in the Configuration Table (CT), the verifier VE optionally uses these keys $K_i$ to decrypt the received response A and to check whether or not the decrypted key corresponds to e.

In a third further embodiment of the invention, instead of the challenge e being chosen randomly, the verifier VE alternatively employs nonces. Nonces are defined as being unique numbers for one-time use.

In a fourth further embodiment of the invention, the prover PR can transport a session key r to the verifier VE by creating a response according to Equation 10 (Eq. 10):

$$A = E\{P_{p2}(p_1)\}(e, r) \quad \text{Eq. 10}$$

wherein E denotes an encryption function.

In Equation 10, both the challenge e and the session key r are encrypted using a key $K = P_{p2}(p_1)$. The session key r is optionally a random number generated by the prover PR. The verifier VE is operable to find a match with a first part of the response A in order to identify the prover PR in a manner as described in the foregoing with reference to FIGS. 1 and 2. When a match with a given prover PR is found, the Verifier VE is able to decrypt a second part of the response A by using a key $P_{p1}(p_2)$ in order to retrieve the session key r value which can then be used as a session key for further subsequent communications.

Figure 3:
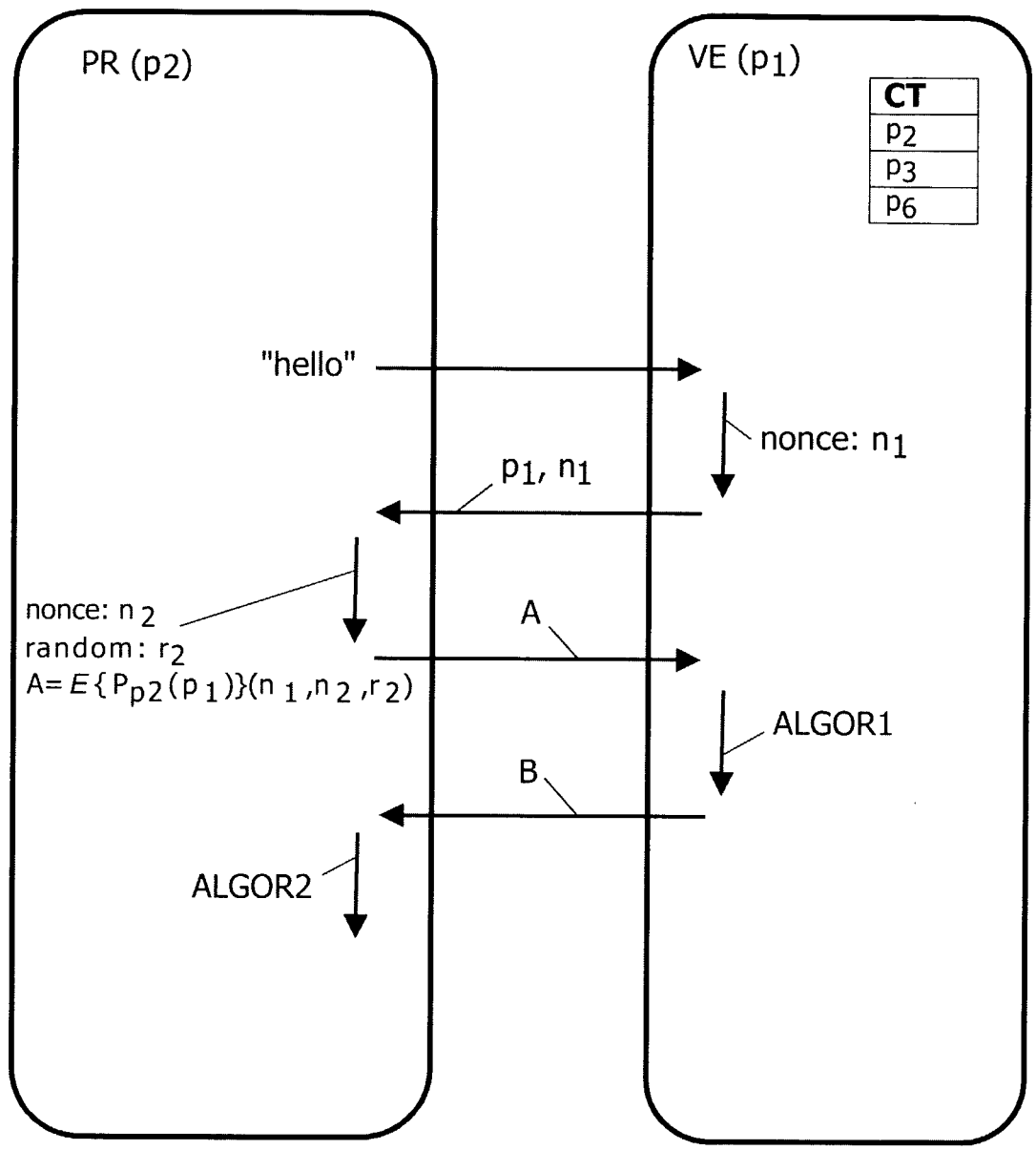
FIG. 3 is a depiction of communication exchange in a mutual authentication protocol between the devices $p_2$ and $p_1$.

In FIG. 3, there is shown a communication exchange, namely a protocol, utilizing two random number session keys $r_1, r_2$. These session keys $r_1, r_2$ can be used to derive a mutual key, for example by way of $h(r_1, r_2)$. It is to be noted that in such a combined protocol that identity of one of the devices involved remains secret whilst the identity of the other device is revealed. Such a protocol according to the invention is thus known as a half-private mutually authenticated key establishment protocol.

The protocol depicted in FIG. 3 is similar to a "point-to-point" key transport protocol with associated challenge-response presented in chapter 12 of a book having title "Handbook of Applied Cryptography" by Menezes et al.; however, the protocol of FIG. 3 differs in that the key K is derived using the aforesaid polynomial scheme described with reference to FIG. 1. On account of the prover PR needing to stay anonymous towards observers or eavesdroppers, the prover PR does not send its identity over a communication channel, thereby requiring that the verifier VE has to search in its list CT to find a matching identity.

Steps of the protocol depicted in FIG. 3 are as provided in Table 1:

TABLE 1

| STEP | ACTION |
|---|---|
| Step 1 | The prover PR notifies its presence to the verifier VE by using an "hello" message 300. |
| Step 2 | The verifier VE sends a nonce $n_1$ to the prover PR, together with the verifier's (VE's) identity value $p_1$. |
| Step 3 | The prover PR calculates an encryption key $K = P_{p2}(p_1)$ by evaluating its private polynomial P in the point $y = p_1$. |
| Step 4 | The key K thereby calculated in step 3 is used by the prover PR to encrypt the retrieved nonce $n_1$ together with generating a new nonce $n_2$ and a random number $r_2$. These parameters $n_1, n_2$ and $r_2$ are then encrypted to generate a response A which is communicated back from the prover PR to the verifier VE. |
| Step 5 | The verifier VE tries to decrypt the response A received thereat using all keys that can be formed from m identities in its configuration table CT, namely according to Equation 11 (Eq. 11):<br>$K_j = P_{p1}CT(j)$     Eq. 11 |
| Step 6 | The verifier VE then checks whether or not one of the decryptions results in a previously created nonce $n_1$ that it has sent in the previous communication step of the protocol. The identity value $p_i$ for which a match is found is denoted by $p_x$. The identity $p_x$ is thereby authenticated. |
| Step 7 | The verifier VE then proceeds to generate an encrypted packet containing values $n'_2, n_1 r_1$ wherein $n'_2$ is the nonce retrieved from the response A, $n_1$ is a nonce as described in the foregoing, and $r_1$ is a newly generated random number; from these parameters, the verifier VE generates an encrypted packet of data to send back to the prover PR. |
| Step 8 | The prover PR finally decrypts the encrypted packet received thereat using the key K and then checks whether or not the decrypted packet includes its own nonce $n_2$ and the nonce $n_1$ that it received earlier. |
| Step 9 | The prover PR knows values for the parameters $r_2$ and $r'_1$. Likewise, the verifier VE knows values for the parameters $r_1$ and $r'_2$. Authentication is successful when $r_1' == r_1$ and $r_2' == r_2$. These keys can be combined to derive session keys to encrypt and MAC further communications. MAC is an abbreviation for "Message Authentication Code". |

The protocols according to the invention elucidated in the foregoing are capable of being used for achieving mutual authentication in conjunction with key establishment. Thus, it is preferable in many practical uses of the present invention to have protocols that provide mutual authentication and produce a mutually authenticated key. Many contemporary mutual authentication protocols are based on key transport or key arrangements. All these contemporary protocols based on symmetrical key techniques assume that a mutual long-term key is available before the protocols are invoked. In contradistinction to known protocols, the aforementioned protocol according to the invention provides a long-term key by equating $K = P_{p2}(p_1)$, namely Equation 6, whilst keeping the identity of the prover PR secret, the aforementioned protocol according to the invention thereby being extensible to provide a mutually authenticated key.

In FIG. 3, ALGOR1 and ALGOR2 correspond to first and second algorithm procedures which are provided in greater details in Tables 2 and 3 respectively.

TABLE 2

For j = 1..m
    $n'_1, n'_2, r'_2 = D\{P_{p1}[CT(j)]\}(A)$
    if $n'_1 == n_1$
        $p_x = CT(j)$
    end
end
random: $r_1$
$B = E\{P_{p1}(p_x)\}(n'_2, n_1, r_1)$

TABLE 3

$$n''_2, n''_1, r'_1 = D\{Pp2(p1)\}(b)$$
Check that $n''_2 == n_2$
Check that $n''_1 == n_1$ $D\{k\}(c)$ denotes decryption of cipher-text c using a key k; and $E\{k\}(m)$ denotes encryption of a message m using a key k.

In operation, it is important that the verifier VE does not stop the protocol elucidated in Table 1 with reference to FIG. 3 if the verifier VE is unable to find an identity in its Configuration Table (CT) that matches with the received response A. Namely, in an event that the verifier VE halts the protocol of Table 1, an observer is potentially capable of learning that the prover PR attempting to authenticate is not an entity listed in the Table (CT); it will be, of course, appreciated from the foregoing that the Table (CT) is publicly accessible. The protocol of Table 1 is therefore optionally further refined in such a situation so that the verifier VE creates a decoy message B in the event of it being unable to find a match; the observer is then potentially unable to distinguish the decoy message B from a genuine message B. The decoy message is constructed depending upon a particular form of encryption utilized in implementing the protocol described in Table 1.

The method of authentication based on polynomials described in the foregoing and illustrated in FIG. 1 regarding establishment of identities and in FIGS. 2 and 3 regarding protocol once identities have been established are susceptible to being applied in a wide range of practical applications. Such practical applications include:

(a) tag readers: for example personnel access tags in high security establishments, in prisons; use of the invention with radio frequency identification RFID is especially pertinent;

(b) in communication systems where secure and authenticated communication channels are required: for example in banking systems, in health care systems where personal health records need to be stored and communicated in a secure manner; and (c) in anti-counterfeiting measures: for example where electronic tags are attached to products conforming to the present invention, said electronic tags being electronically interrogated, for example, at import/customs to check for counterfeit wares.

In the accompanying claims, numerals and other symbols included within brackets are included to assist understanding of the claims and are not intended to limit the scope of the claims in any way.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

The invention claimed is:

1. A method of authentication based on polynomials for a system comprising a plurality of devices operable to mutually communicate, said method comprising:

providing each of said plurality of devices with a corresponding identity value together with an associated polynomial for generating a unique polynomial key for each device;

arranging for the plurality of devices to include a verifier device and a prover device;

arranging for the prover device to notify its existence to the verifier device;

arranging for the verifier device to issue a first challenge to the prover device to encrypt a nonce using the prover device's unique polynomial key and communicate the encrypted nonce as a response back to the verifier device;

arranging for the verifier device to receive the encrypted nonce as the response from the prover device and:

to decrypt the response received from the prover device using each of the unique polynomial keys until said verifier device identifies a match between the decrypted response and the first challenge;

said match being indicative of authentication;

wherein a random value is additionally created by the prover device and encrypted together with a response from the verifier device for sending back to the verifier device, said random value being operable to function as a session key.

2. The method as claimed in claim 1, wherein issuance of the identity values and associated polynomials is undertaken via a trusted third party.

3. The method as claimed in claim 1, further including establishing a session key which can be used for further subsequent communications for providing mutual authentication for said plurality of devices and for providing privacy to at least one of said plurality of devices.

4. The method as claimed in claim 1, wherein the first challenge from the verifier device to the prover device is implemented such that the nonce is a random number.

5. The method as claimed in claim 1, said method further including configuring the system so that said plurality of devices includes multiple prover devices and multiple verifier devices, said multiple prover devices including a subset of prover devices operable to authenticate to a particular verifier device of the multiple verifier devices.

6. The method as claimed in claim 1, wherein said prover devices are implemented as smart cards or tags enabling access to services related to or coupled to a given verifier device.

7. The method as claimed in claim 1, wherein the prover device is operable to apply a hash function or keyed hash function to create a response to the first challenge from the verifier device.

8. A system comprising a plurality of devices operable to mutually communicate, said system comprising:

a trusted third party to provide each of said plurality of devices with a corresponding identity value together with an associated polynomial for generating a unique polynomial key for each device;

the plurality of devices to include a verifier device and a prover device;

the prover device to notify its existence to the verifier device;

the verifier device to issue a first challenge to the prover device to encrypt a nonce using the prover device's unique polynomial key and communicate the encrypted nonce as a response back to the verifier device;

the verifier device to receive the encrypted nonce as the response from the prover device and:

to decrypt the response received from the prover device using each of the unique polynomial keys until said verifier device identifies a match between the decrypted response and the first challenge;

said match being indicative of authentication;

wherein a random value is additionally created by the prover device and encrypted together with a response from the verifier device for sending back to the verifier device, said random value being operable to function as a session key.

9. The system as claimed in claim 8, the system being adapted for providing at least one of:
   authentication associated with financial transactions executed within banking systems; and
   controlling access by way of tags or similar portable identifiers authenticating within a system operable according to the method.

10. A non-transitory data carrier comprising software executable on computing hardware to implement the method as claimed in claim 1.

11. A smart card or tag for undertaking authentication in an authentication system, the system comprising:
   a trusted third party to provide each of said plurality of devices with a corresponding identity value together with an associated polynomial for generating a unique polynomial key for each device;
   the plurality of devices to include a verifier device and a prover device;
   the prover device to notify its existence to the verifier device;
   the verifier device to issue a first challenge to the prover device to encrypt a nonce using the prover device's unique polynomial key and communicate the encrypted nonce as a response back to the verifier device;
   the verifier device to receive the encrypted nonce as the response from the prover device and:
   to decrypt the response received from the prover device using each of the unique polynomial keys until said verifier device identifies a match between the decrypted response and the first challenge;
   said match being indicative of authentication;
   wherein a random value is additionally created by the prover device and encrypted together with a response from the verifier device for sending back to the verifier device, said random value being operable to function as a session key.

* * * * *